Figure 1B:
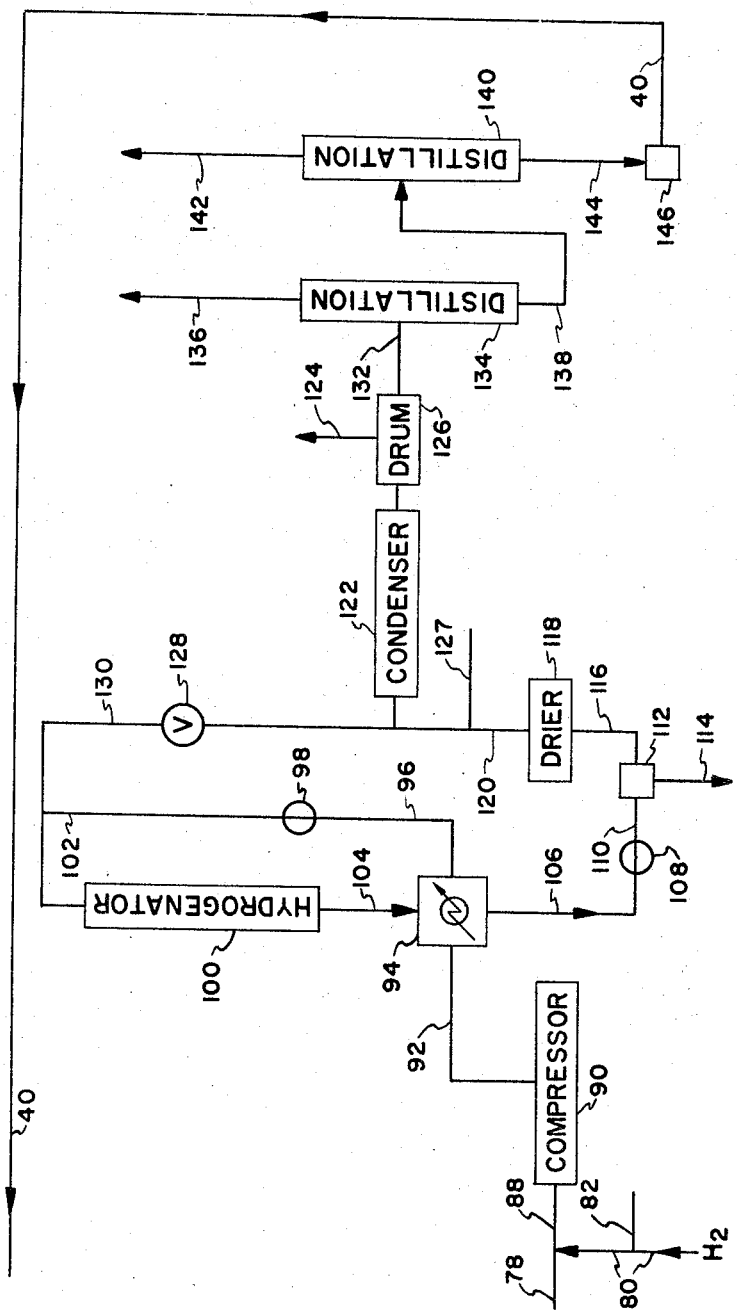

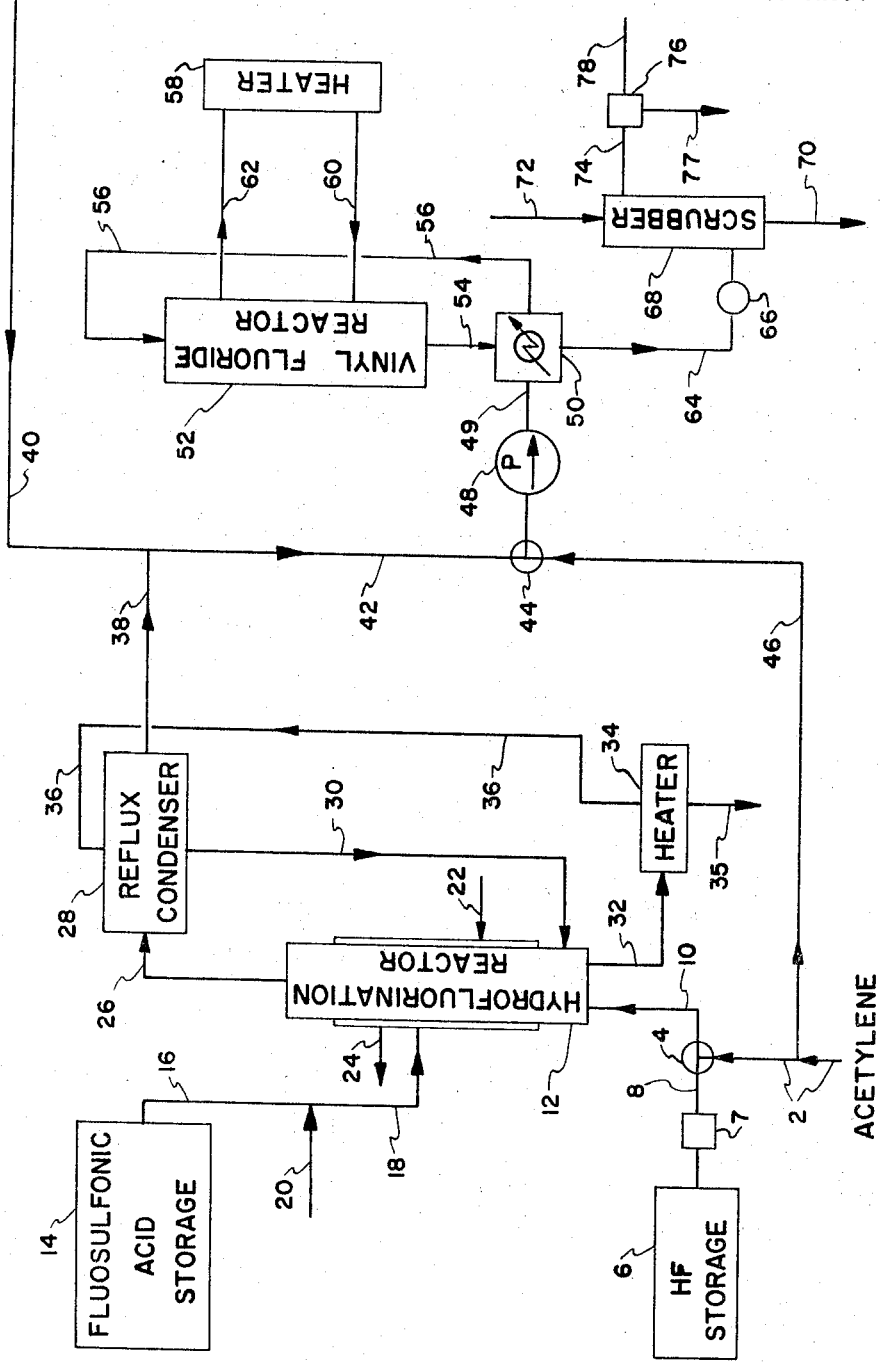

United States Patent Office 3,317,619
Patented May 2, 1967

---

3,317,619
PREPARATION OF VINYL FLUORIDE
Thomas E. Hedge, Wickliffe, Daniel F. Cooley, Mentor, Charles E. Entemann, Painesville, Roland Steinkoenig, Chardon, and Richard L. Urbanowski, Painesville, Ohio, assignors to Diamond Alkali Company, Cleveland, Ohio, a corporation of Delaware
Filed May 10, 1963, Ser. No. 279,426
12 Claims. (Cl. 260—653.3)

This invention relates to a process for the production of fluorohydrocarbons. More particularly, the present invention relates to a new, improved and economically feasible integrated process for the production of vinyl fluoride.

Vinyl fluoride has valuable commercial uses as an intermediate in organic synthesis; as a monomer in the production of plastics, such as polyvinyl fluoride, synthetic rubber and the like. It has heretofore been proposed to manufacture vinyl fluoride by reacting acetylene with hydrogen fluoride in the presence of various hydrofluorination catalysts.

Hydorfluorination of acetylene is complicated by the fact that both acetylene and overfluorinated by-products are generally present in the vinyl fluoride requiring difficult and expensive separation means. This difficulty has prevented the development of a completely satisfactory hydrofluorination process in spite of the great activity in this field due to the considerable commercial importance of vinyl fluoride.

In the known methods of carrying out the hydrofluorination of acetylene to vinyl fluoride, the processes proposed are too inefficient to be of commercial significance. These processes involve numerous difficulties such as expensive catalysts which have short reaction life, long induction periods, low space-time yields, poor product yields and poor selectivity of hydrogen fluoride addition resulting in the presence of acetylene and byproduct overfluorinated compounds in the vinyl fluoride. Further, vinyl fluoride monomers heretofore prepared contain small but significantly objectionable amounts of acetylene, the presence of which is highly objectionable in the production of polymeric vinyl fluoride. Moreover, the removal of small amounts of acetylene from the vinyl-fluoride monomer by even the best controlled known separation methods is commercially unsatisfactory.

In accordance with the present invention vinyl fluoride monomer is produced in high yields and in a substantially pure state by an economically feasible, integrated combination process comprising the forming of 1,1-difluoroethane by reacting acetylene and hydrogen fluoride in the presence of hydrofluordination catalyst, reacting the 1,1-difluoroethane product with acetylene in the presence of a disproportionation catalyst to obtain vinyl fluoride, selectively hydrogenating the vinyl fluoride product to convert any remaining traces of acetylene to ethylene and ethane and distilling the hydrogenated product to recover a substationally pure vinyl fluoride monomer in high yields from the reactants and by-products.

It has been known that 1,1-difluoroethane can be prepared by the reaction of acetylene with hydrogen fluoride (HF), usually in the presence of a catalyst. In most cases vinyl fluoride is simultaneously produced in material proportions, frequently equal to or exceeding the amounts of 1,1-difluoroethane. For instance, when a catalyst system such as mercuric oxide, cuprous cyanide, chromium-containing compounds, e.g., the oxides of chromium, chromium salts and acids, aluminum sulfate, zinc compounds, e.g., zinc oxide, zinc nitrate and zinc sulfide and the like, either alone or supported on a catalytic support such as, for example, silica gel, silica-alumina, activated alumina, activated carbon and the like have been used, vinyl fluoride has been found to be produced in material proportions. Such mixtures require costly separation steps in order to obtain the 1,1-difluoroethane sufficiently pure for most purposes, including efficient use in the process for its conversion to vinyl fluoride.

However, the prior art discloses methods wherein 1,1-difluoroethane is produced in a sufficiently pure state for most purposes, including efficient use in the process for its conversion to vinyl fluoride; for instance, Burk et al., in U.S. Patent No. 2,425,991, have shown that 1,1-difluoroethane can be obtained substantially free of vinyl fluoride by reacting acetylene with liquid HF, containing boron trifluoride as the catalyst. Also in U.S. Patent No. 2,830,100, a process is set forth providing a continuous method for the preparation of substantially pure 1,1-difluoroethane from actylene and liquid hydrogen fluoride. The process of this patent comprises dissolving an anhydrous metal chloride of the group consisting of titanium tetrachloride and antimony pentachloride in the substantially pure liquid hydrogen fluoride in concentrations of from 1 to about 5 percent, by weight, and passing gaseous acetylene free of catalyst poisons into the hydrogen fluoride solution while maintaining the temperature in the range from about 0° to about 65° C., and pressures of about 0 to about 75 p.s.i.g., sufficient to maintain the hydrogen fluoride in a liquid state at the temperatures employed. Further, in U.S. Patent No. 2,830,101, a process is set forth for producing 1,1-difluoroethane substantially free of vinyl fluoride by a method which comprises contacting a mixture of substantially pure gaseous hydrogen fluoride and gaseous acetylene free of catalyst poisons in a ratio of from about 1.5 to about 3 moles of HF per each mole of acetylene with a porous carbon-supported metal halide catalyst at a temperature of from about 25° to about 75° C. and under a pressure below the condensation pressure of hydrogen fluoride at that temperature.

FIGURE 1, in the accompanying drawing, is a diagrammatical illustration of one type of reaction system for carrying out the process of the present invention more fully described hereinbelow.

In accordance with the method of the present invention, hydrofluorination of acetylene is carried out by reacting the acetylene with hydrogen fluoride in the presence of a promoted fluosulfonic acid catalyst, e.g., a fluosulfonic acid reaction medium containing a catalytic species resulting from the interaction of fluosulfonic acid with an anhydrous metal chloride. The promoted fluosulfonic acid catalyzes the addition of hydrogen fluoride to the unsaturated linkage of the compound being treated so that the hydrofluorination proceeds smoothly to give good yields of the desired 1,1-difluoroethane with substantially no vinyl fluoride being produced.

The reaction medium of fluosulfonic acid contains dissolved therein the product of the reaction of fluosulfonic acid with about 0.5 to 5, preferably 1 to 3 percent by weight of an anhydrous metal chloride. Suitable metal chlorides include tin tetrachloride, titanium tetrachloride, antimony pentachloride and the like with tin tetrachloride being preferred. In U.S. Patent No. 2,462,-359, a hydrofluorination method is proposed wherein acetylene is hydrofluorinated with hydrogen fluoride in the presence of fluosulfonic acid. It is reported that, besides the production of 1,1-difluoroethane, vinyl fluoride is simultaneously produced in almost equal amounts. However, acetylene reacts directly with fluosulfonic acid producing a loss of both reactant and catalyst, resulting in an unsatisfactory short catalyst life. It has, however, been found that operating the hydrofluorination step at the conditions recited below and using the promoted catalyst system hereinabove described, the life of the catalytic medium is significantly extended. This may be seen from the data presented in Table I below.

TABLE I
[Conditions: 30° C.; HF/C$_2$H$_2$=2/1; Space Velocity=82]

| Time (hrs.) | HSO$_3$F Product Analysis | | HSO$_3$F+1% SnCl$_4$ Product Analysis | |
|---|---|---|---|---|
| | Mole Percent 1,1-Difluoro-ethane | Mole Percent C$_2$H$_2$ | Mole Percent 1,1-Difluoro-ethane | Mole Percent C$_2$H$_2$ |
| 0 | 100 | 0 | 100 | 0 |
| 4 | 100 | Trace | 100 | 0 |
| 8 | 99.98 | 0.02 | 100 | 0 |
| 12 | 99.7 | 0.3 | 100 | 0 |
| 16 | 99.3 | 0.7 | 100 | 0 |
| 20 | 98.4 | 1.6 | 100 | 0 |
| 24 | 97.6 | 2.4 | 100 | 0 |
| 28 | 95.0 | 5.0 | 100 | Trace |
| 32 | 89.2 | 10.8 | 99.9 | 0.1 |
| 36 | 89.3 | 10.7 | 99.7 | 0.3 |
| 40 | 81.6 | 18.4 | 99.0 | 1.0 |
| 44 | 70.1 | 29.9 | 97.7 | 2.3 |
| 48 | | | 95.1 | 4.9 |
| 52 | | | 93.0 | 7.0 |

The maximum level of vinyl fluoride in the 1,1-difluoroethane product stream was found to be only a trace amount detectable by gas-liquid chromatography. Although we do not wish to be bound by this theory, it is believed that the anhydrous metal chloride reacts with the fluosulfonic acid. The reaction product, in the fluosulfonic acid medium, has a catalytic effect greater than the fluosulfonic acid alone and thereby increases the rate of reaction of hydrogen fluoride with acetylene at the expense of the reaction of fluosulfonic acid with acetylene.

In carrying out the process of our invention, acetylene is mixed with anhydrous hydrogen fluoride and the mixture passed through the promoted fluosulfonic acid catalyst in a reaction vessel. The hydrogen fluoride may be either in the gaseous or liquid state, but it is preferred in the hydrofluorination operation of the present invention that hydrogen fluoride be vaporized before it is contacted with the hydrofluorination catalyst. The amount of hydrogen fluoride mixed with acetylene may vary somewhat but generally the reactants are employed in a mole ratio of from about 1 to 5:1, preferably about 1.5 to 3:1 of hydrogen fluoride to acetylene.

The temperature at which the reaction is carried out may vary considerably, since the use of the fluosulfonic acid catalytic medium permits hydrofluorination to be carried out smoothly and without danger of explosion at temperatures between −40° and about +160° C. Generally, however, the temperatures are in the range of about 10° to 90° C., preferably about 20° to 70° C. The pressure at which the reaction is carried out is preferably atmospheric pressure, but superatmospheric pressures may be employed if desired; for instance, pressures of up to about 100 to 200 p.s.i.g. or more may be employed. The mixture of hydrogen fluoride and acetylene is generally passed through the fluosulfonic acid catalytic medium at a superficial gas velocity (HF+C$_2$H$_2$) at a rate of from about 0.05 to about 1, preferably about 0.1 to 0.5 feet per second, and a space velocity of from about 20 to about 200 liters of acetylene per liter of fluosulfonic acid per hour, preferably about 40 to about 150 liters of acetylene per liter of fluosulfonic acid per hour.

Therefore, a preferred embodiment of the hydrofluorination process of this invention involves passing a gaseous mixture of acetylene and hydrogen fluoride through a liquid reaction medium comprising fluosulfonic acid having dissolved therein the product of the reaction of fluosulfonic acid with a minor amount of an anhydrous metal chloride, while maintaining the reaction medium at a temperature of from about 10° to about 90° C., preferably in the range of from about 20° to 70° C. at a pressure of from 0 to about 100 to 200 or more p.s.i.g., preferably at atmospheric pressure.

The reaction may be carried out as a batch or continuous process. However, the preferred method for hydrofluorinating acetylene in accordance with the present invention involves a continuous operation of passing a mixture of acetylene and hydrogen fluoride through a series of reaction zones containing the fluosulfonic acid catalytic medium in order to insure complete conversion of the acetylene to 1,1-difluoroethane. It has been found that, by such a procedure, 1,1-difluoroethane is obtained efficiently in excellent yields substantially free of vinyl fluoride and hydrogen fluoride. The product concentration varies from about 95 to about 99.9 percent difluoroethane, as can be readily seen from Table I, above.

Vinyl fluoride has previously been prepared by dehydrofluorinating 1,1-difluoroethane at high temperatures. While 1,1-difluoroethane may be dehydrofluorinated to yield some vinyl fluoride, there is a tendency for the decomposition to yield primarily acetylene. It has also been found that the dehydrofluorination of 1,1-difluoroethane, to yield vinyl fluoride in increased amounts with little decomposition, may be achieved with the use of dehydrofluorinating agents or catalysts bettter to control the reaction than that obtained by thermodehydrofluorination alone; thus avoiding by-product formation. Dehydrofluorination catalysts which have been used in the past include chromium fluoride, aluminum fluoride, aluminum sulfate, aluminum chloride, basic materials such as sodium, lithium or calcium oxide; sodium carbonate, potassium hydroxide, and basic organic substances such as pyridine, quinoline, formamide, etc., acidic substances, such as silica, silica gel, alumina, alumina gel, activated alumina, aluminum chloride, aluminum trifluoride, zinc bromide, ferric chloride, phosphotungstic acid, silicotungstic acid and phosphomolybdic acid, and neutral or substantially neutral materials such as charcoal, barium phosphate, calcium sulfate, corundum, glass fragments, etc. The catalytic decomposition of 1,1-difluoroethane to vinyl fluoride may be effected at ordinary or increased temperatures, and in a liquid or vapor phase depending on the nature of the dehydrofluorinating agent.

The use of high temperatures which tend to subdue or entirely eliminate side reaction is preferred. It has been found that the optimum conditions for the dehydrofluorination of 1,1-difluoroethane to vinyl fluoride comprises the use both of heat and a catalyst. Vinyl fluoride should not be present in the 1,1-difluoroethane initially since as little as 1 percent of vinyl fluoride in the 1,1-difluoroethane materially shortens the life of the catalyst and thus renders dehydrofluorination in the process inefficient.

In the integrated process of the present invention, conversion of the 1,1-difluoroethane to vinyl fluoride is effected by a disproportionation reaction whereby acetylene reacts with 1,1-difluoroethane in the presence of a disproportionation catalyst at elevated temperatures to produce vinyl fluoride. The disproportionation catalyst is generally heated to a temperature of from about 200° to 400° C., preferably to about 225° to 300° C., and maintained at such temperatures while gaseous 1,1-difluoroethane and acetylene are passed through it at a space velocity (standard volume of feed gas per volume of catalyst per hour) of from about 100 to about 400, with a preferred space velocity of from about 200 to about 300.

The addition of an inert diluent gas such as, for instance, nitrogen, may be beneficial in order to minimize localized heating. The 1,1-difluoroethane and actylene are introduced into the disproportionation reactor generally in a molar ratio of from about 1.0 to 4.0, preferably about 1.5 to 3.0:1 of the difluoroethane to acetylene. The excess difluoroethane used in the disproportionation reaction is employed to minimize the amount of acetylene in the vinyl fluoride product. Pressure conditions in the disproportionation reactor may be varied over a wide range; for instance, from subatmospheric pressure up to or greater than about 200 p.s.i.g., but preferably the disproportionation reaction is conducted at atmospheric pressures.

The preferred disproportionation catalyst comprises partially hydrated aluminum fluoride with a graphite binder and having a moisture content of less than about 1 percent. Such a catalyst may be prepared by extruding hydrated aluminum fluoride with graphite into ⅛″ pellets and treating the pelletized aluminum fluoride with a stream of nitrogen for from about 1 to 8 hours, preferably about 4 hours, at a temperature of from about 200° to 400° C., reducing the moisture content to less than about 1 percent. The aluminum fluoride catalyst is preferably employed in the form of a fixed catalyst bed.

It has, however, been found quite difficult to completely react acetylene to vinyl fluoride, due to the equilibrium decomposition of the product over the aluminum fluoride catalyst. There is generally from about 1 to 5 mole percent acetylene present in the vinyl fluoride depending upon the ratio of 1,1-difluoroethane to acetylene employed and the reaction conditions in the disproportionation reaction. This small but consequential amount of acetylene has to be removed or reduced to a negligible amount before the vinyl fluoride monomer may be properly polymerized. As mentioned previously, the removal of even small amounts of acetylene from vinyl fluoride by even the best controlled known distillation methods is commercially unsatisfactory. The gas stream from the vinyl fluoride reactor contains primarily vinyl fluoride, excess reactants; namely, difluoroethane and acetylene, and trace amounts of several by-products, such as ethylene and hydrogen fluoride. By conventional separation means, all of the components of the product stream can be readily separated from the vinyl fluoride product, except for the acetylene. The hydrogenation step provides efficient removal of the contaminating acetylene from the gaseous product containing the vinyl fluoride monomer, so that the acetylene content is reduced to only a few parts per million by a simple, economical, easily-controlled hydrogenation process.

In the integrated process of the present invention, acetylene is removed from the vinyl fluoride without causing any significant decomposition of the vinyl fluoride by selectively hydrogenating acetylene to ethylene and/or ethane, resulting in a final vinyl fluoride product containing less than about 10 p.p.m. of acetylene, based on the weight of the vinyl fluoride. In accordance with this invention, the gas containing the acetylene as an impurity is subjected, in a suitable reactor at elevated temperatures, to the action of a hydrogenation catalyst, such as, for instance, a Group VIII metal of the periodic table, e.g., the ferrous metals; namely, iron, cobalt and nickel or the platinum metals, namely, ruthenium, rhodium, palladium, osmium, iridium and platinum. Group VIII metal catalysts, particularly the platinum metals, have been used as catalysts in the direct hydrogenation of acetylene to ethylene and/or ethane by adding an excess of hydrogen. In such a process of direct hydrogenation, product gases containing the acetylene, together with an excess of hydrogen, are generally passed over the hydrogenating metal, preferably on a catalytic support (alumina, kieselguhr, charcoal, activated carbon, etc.) and/or a promoter (molybdenum, etc.), enhancing the surface dispersion activity of the metal to advantage.

In the hydrogenation step of the present invention, selective hydrogenation of the hydrocarbon mixture, containing up to about 5 mole percent acetylene, is accomplished by passing the gaseous mixture together with hydrogen in a quantity at least stoichiometrically equivalent to the acetylene content of the gaseous mixture over the catalyst, preferably at elevated temperature and pressure conditions. The hydrogen for the hydrogenation of acetylene is usually present in the vinyl fluoride product gaseous stream in molar excess of that required for hydrogenation of the acetylene to ethylene. The molar ratio of hydrogen to acetylene may be in the range of from about 1 to about 4:1, preferably about 1.5 to 2.5:1. The temperature employed in the hydrogenation step may be from about 40° to about 500° C., preferably about 65° to 150° C. Pressures may generally be within the range of from about 0 to about 1,000 p.s.i.g., preferably in the range of from about 100 to about 600 p.s.i.g. The space velocity may be in the range of from about 200 to about 10,000 volumes of gas per volume of catalyst per hour, and preferably a gaseous hourly space velocity of about 500 to 8,000 volumes of gas per volume of catalyst can be employed.

The hydrogenation selectivity of acetylene may be effected while minimizing the hydrogenation of the vinyl fluoride by the addition to the hydrogen of well-known hydrogenation catalyst poisons, such as, for example, carbon monoxide, organic sulfur compounds, hydrogen sulfide, etc. The concentration of the inhibitor in the hydrogenation system is dependent upon the amount and activity of the hydrogenation component in the catalyst and may vary over a wide range of concentrations. In the practice of the present invention it has been found that the selective hydrogenation of acetylene in admixture with vinyl fluoride to below specification level is effected when carbon monoxide is present in amounts up to about 100 p.p.m., preferably in amounts of from about 25 to about 75 p.p.m. carbon monoxide, based on a total feed stream to the hydrogenation reactor.

Preferred hydrogenation catalysts, whereby a gas product distribution, containing less than about 10 p.p.m. of acetylene, is achieved, comprise palladium on a catalytic support, e.g., alumina, activated carbon, charcoal, etc., wherein the palladium content of the catalyst may generally be in the range of from about 0.001 or less up to about 3 percent, preferably about 0.01 to 1 percent by weight of catalyst. The catalytic support may be used in the form of small lumps or pellets which may be of any shape, for example, spherical or cylindrical; for instance, a cylindrical pellet ⅛-inch in length and ⅛-inch in diameter has been found suitable. The hydrogenation component may be deposited on the support by any of the known procedures for making supported catalysts, for instance, by impregnation, precipitation, or coprecipitation methods.

The palladium catalyst may be produced by contacting certain palladium compounds, for instance the sodium salt $Na_2PdCl_4$, tetrachloropalladic acid, in aqueous solution with the supporting carrier which is insoluble in water in such manner that the palladium compound hydrolyzes and forms a firm and inherent deposit of palladium oxide or hydroxide on the surface of such carrier. The oxide so formed is subsequently reduced to catalytically active palladium metal by decomposing the oxide at temperatures up to about 500° C., preferably within the range of 150° C. to 400° C., but below a temperature at which sintering of the catalytic support may occur.

The catalyst may be further treated with a reducing gas such as hydrogen to reduce any palladium oxide on the catalyst support before use in the process of the invention. The reduction may suitably be carried out at a temperature within the range of about 25° C. to about 450° C. The catalyst may also contain other catalytic metals in minor amounts so long as the essential catalyst metal possesses hydrogenation activity, and its characteristic for selectivity is not interfered with.

The purification of the crude vinyl fluoride monomer containing less than 10 p.p.m. acetylene may be accomplished in any of the well-known distillation techniques.

It is, however, preferred that the purification of the crude monomer be conducted in a series of distillation towers. For the purpose of the present invention, it has been found that two distillation towers will be sufficient. The distillation may be conducted over a wide range of temperature and pressure conditions with the pressure dependent upon the temperature. In the first column, the light ends, comprising about 2 to 3 percent of the total feed, are removed. This column may be operated at pressures within the range of about 200 to about 500 p.s.i.g. with a preferred pressure within the range of about 250 to about 350 p.s.i.g., and at a head temperature of about −20° to about −5° C. with a preferred temperature of about −10° C. to effect separation between ethane (B.P. at −88.6° C.) and vinyl fluoride (B.P. at −72° C.). The overhead is essentially ethylene and ethane with some vinyl fluoride present. The bottoms from the first distillation column, containing essentially vinyl fluoride and difluoroethane with some ethyl fluoride, are fed to a second distillation column conducted at a head temperature of −10° to 15° C., preferably about 0° C. and under a pressure of about 150 to 300 p.s.i.g. with a preferred pressure of about 200 p.s.i.g. The overhead comprises esesntially pure vinyl fluoride monomer. The substantially pure vinyl fluoride monomer may be stored in storage tanks for use in a polymerization process. If required, a polymerization inhibitor may be added to storage tanks to insure that the vinyl fluoride monomer is not polymerized prematurely.

In order to provide a more comprehensive understanding of the present invention, reference is made to the drawing which shows a diagrammatic flow of the process of the invention.

Acetylene, drawn from a storage source (not shown), is conveyed via line 2 to mixing apparatus 4 which may be a high-velocity jet, or other suitable mixing device, where it is commingled with vaporized hydrogen fluoride drawn from storage tank 6, vaporized in vaporizer 7 and passes to mixing apparatus 4 via line 8. The resulting gaseous mixture passes via line 10 into reactor 12 where it flows upwardly through the fluosulfonic acid where the vaporized gases become intimately dispersed in the catalyst medium and reaction is effected. The liquid fluosulfonic acid is introduced into the reactor via line 16 and 18 from storage tank 14. Anhydrous metal chloride may be introduced into the fluosulfonic acid by line 20. The reaction temperature in reactor 12 may be controlled by the introduction of chilled water via line 22 to a jacket surrounding reactor 12 and removed via line 24. This circulating water is used to control the temperature of the reactor within the specified ranges described hereinabove. The gaseous reaction product passes out of reactor 12 through line 26 to reflux condenser 28 where any unreacted hydrogen fluoride is removed from the overhead product and recycled to reactor 12 via line 30. The spent promoted fluosulfonic acid catalyst may be removed from reactor 12 via line 32 and passed to heater 34 where dissolved hydrogen fluoride and difluorethane are stripped off and recycled to the reflux condenser via line 36. The spent catalyst is removed from heater 34 via line 35 into a neutralizer (not shown), where it is reacted with a lime slurry and periodically drained into a waste sump for disposal.

The 1,1-difluoroethane, substantially free of hydrogen fluoride, passes from reflux condenser 28 via line 38 and blended with recycled stream 40 containing 1,1-difluoroethane and a small amount of ethyl fluoride and conveyed via line 42 to mixing unit 44. The blended 1,1-difluoroethane stream is further mixed with acetylene entering mixing unit 44 via line 46. The combined stream of 1,1-difluoroethane and acetylene is adjusted to maintain a ratio of difluoroethane to acetylene in the ratios recited above. The combined stream is then passed through blower 48 via line 49 to heat exchanger 50 where the feed stream is preheated by the vinyl fluoride product exiting from reactor 52 via line 54 and introduced into reactor 52 via line 56. The combined stream of difluoroethane and acetylene is introduced into reactor 52 and reacted in the presence of catalytic material to produce vinyl fluoride. The temperature in reactor 52 may be regulated by circulating oil entering the reactor via line 60. Provision is made so that the oil can be heated in gas-fired heater 58 to bring reactor 52 up to a temperature for reaction start-up; or the oil can be cooled to remove the heat of reaction once the reaction has been initiated. The oil exits from reactor 52 via line 62. Reactor 52 may comprise a cylindrical chamber containing a plurality of heat exchange tubes wherein the oil flows in countercurrent indirect heat exchange with the combined feed stream flowing downwardly through the catalytic material contained in the vertical tubes. The reactor preferably has a fixed bed of catalytic material wherein the catalyst is contained in the vertical tubes and the oil circulated around the vertically rising tubes so that the temperature may be maintained at a constant temperature. The feed stream passes down through the catalytic material and exits via line 54, and passes through heat exchanger 50 wherein it preheats the feed entering by line 49.

The product leaving the vinyl fluoride reactor 52 passes via lines 54 and 64 through a cooler 66 to scrubbing tower 68. The vinyl fluoride product stream is scrubbed in tower 68 countercurrently with water and/or caustic entering the scrubbing tower by line 72 to remove hydrogen fluoride. The scrubbing solution is heated in the bottom of tower 68 for instance by a steam coil (not shown) to strip off dissolved difluoroethane and the exhausted scrubbing solution is removed via line 70. The scrubbed vinyl fluoride product gas is removed from scrubber 68 via line 74 and passed through a cooler 76 where it is chilled to remove the major portion of its water content via line 77.

The scrubbed gas exits from cooler 76 via line 78 and is mixed with hydrogen which is introduced into line 78 via line 80. Carbon monoxide may be metered into the hydrogen line 80 from a source (not shown) via line 82 to maintain a carbon monoxide concentration in the hydrogen stream as recited above. The combined gas stream is conducted to a compressor 90 via line 88 and the pressurized gas stream passes via line 92 to heat exchanger 94 where the pressurized gas stream is preheated by the hydrogenated product exiting from hydrogenator 100 via line 104. The preheated compressed gas is conveyed through heater 98 via line 96 to hydrogenator 100 via line 102. The heated gas flows downwardly through a bed of a hydrogenating catalyst wherein the acetylene in the compressed gas stream is selectively hydrogenated to ethylene and/or ethane. Hydrogenator reactor, 100, is operated adiabatically with the exothermic hydrogenation of acetylene resulting in a temperature rise across the reactor.

The hydrogenated gases exit from the reactor by line 104 and pass through heat exchanger 94 to preheat the compressed feed gases. The resultant partially cooled hydrogenated gas stream is passed through cooler 108 via line 106. The cooled hydrogenated gas stream passes from cooler 108 via line 110 to a tank 112 where water is separated from the hydrogenated gas product via line 114 and the hydrogenated gas product is then passed to a drying unit 118 via line 116 to effect essentially complete removal of the remaining water vapor.

The process control at this point becomes critical. If, due to some upset upstream, the acetylene content of the product gas stream is above specification, it is essential that the high acetylene material not carry over into the distillation section; therefore, it is necessary to monitor closely the acetylene content from the gas stream just prior to condensing. If the acetylene content is above specification, the gas stream from drier 118 is diverted by recycling it to the hydrogenation reactor through valve 128, and lines 130 and 102. If the acetylene content in the gas stream is within specification, the dry gas mixture is then conveyed to condenser 122 via line 120 where the temperature and pressure conditions are regulated so that the non-condensable gases at the temperature chosen are vented from the condensate drum 126 via line 124. The condensate is then conveyed to distillation tower 134 via line 132.

A side stream of the dried gas mixture from drier 118 may be removed from the system via line 127 to ascertain the acetylene content of the gas stream before it passes to condenser 122. Distillation tower 134 is operated such that the light ends, comprising about 2 to about 3 percent of the total feed, are removed as overhead. The overhead, containing mostly ethylene and ethane with some vinyl fluoride, is removed from distillation column 134 via line 136. The bottoms, containing vinyl fluoride, difluoroethane and ethyl fluoride, are conveyed via line 138 to distillation tower 140, where pressure and temperature conditions are such that a substantially pure vinyl fluoride monomer is taken overhead via line 142 and removed for storage for further use. The bottoms from distillation tower 140, containing essentially difluoroethane, ethyl fluoride and some vinyl fluoride, are removed via line 144 and collected in storage tank 146, and if desired may be recycled to the vinyl fluoride reactor 52 via line 40.

In order that those skilled in the art may better understand the present invention and the preferred method by which it may be practiced, the following specific example is offered:

EXAMPLE 1

Into a 5-liter capacity difluoroethane reactor comprising a multi-stage turbine agitated jacketed mixing column containing mixing compartments separated by horizontal annular baffles, and containing four vertical baffles, is added 3.8 liters of technical fluosulfonic acid and about 1 to 3 percent stannic chloride, based on the weight of the fluosulfonic acid.

Acetylene and vaporized hydrogen fluoride are continuously fed into the bottom stage of the difluoroethane reactor in a molar ratio of hydrogen fluoride to acetylene of 2.02:1 with about 1 or 2 mole percent excess of hydrogen fluoride. The hydrofluorination reaction is conducted at a temperature of about 30° to 32° C., at atmospheric pressure, with a superficial gas velocity (hydrogen fluoride plus acetylene) of about 0.1 foot per second and a space velocity of about 82 liters of acetylene per liter of fluosulfonic acid per hour. The reactants and catalyst are continually agitated by a motor-driven turbine agitator at a speed about 900 r.p.m. Chilled water is circulated through the jacket to remove the heat of reaction estimated at about 26 kilocalories per gram mole of difluoroethane.

The product gas analyzes about 99.8 to 100 percent difluoroethane, and about 0 to 0.2 percent acetylene. No vinyl fluoride was ascertainable in the product gas. The product difluoroethane passes through a reflux condenser where most of the contained hydrogen fluoride is removed and returned to the reactor. The difluoroethane product stream is then blended in a recycle stream containing difluoroethane and some ethyl fluoride (less than 3 mole percent) with an acetylene feed stream. The acetylene feed is adjusted to maintain a molar ratio of difluoroethane to acetylene of about 1.6 to 1.8:1. The combined difluoroethane-acetylene feed stream is then boosted in pressure, preheated to about 140° C. and fed to a tubular, catalytic reactor wherein the acetylene and difluoroethane react to produce vinyl fluoride.

The difluoroethane-acetylene feed stream is passed downwardly through a catalyst bed comprising partially hydrated aluminum fluoride with a 6 percent by weight graphite binder in the form of ⅛-inch cylindrical pellets. The reaction temperature is maintained at from about 250° to 300° C. and the feed stream passes through the catalytic bed at a space velocity of from about 200 to 300. The reaction is exothermic, liberating an estimated 6.5 kilocalories per gram of vinyl fluoride formed. The heat is removed by a circulating oil system containing a gas-fired heater for heating the reactor to start-up temperature. The product gas, leaving the vinyl fluoride reactor, analyzes as follows:

| Component: | Mole percent |
|---|---|
| Vinyl fluoride | 64.0 |
| Difluoroethane | 33.0 |
| Acetylene | 1.6 |
| Ethylene | 0.3 |
| Hydrogen fluoride | 1.1 |
| Hydrogen | Trace |

The yield on this reaction, based on the difluoroethane-acetylene feed stream, is about 99 percent with 96 percent of the acetylene feed converted to vinyl fluoride.

The vinyl fluoride product stream is cooled and then scrubbed with water and/or caustic in a Karbate tower to remove hydrogen fluoride. The scrubbed gas is then chilled for removal of its water content and hydrogen is mixed with the gas stream prior to compression and hydrogenation of the acetylene content. Hydrogen, containing a small amount of carbon monoxide is metered into the vinyl fluoride product stream so that the overall carbon monoxide concentration in the feed stream is maintained at about 50 p.p.m. The combined gas stream is then compressed to about 200 p.s.i.g. and preheated to about 65° C. and fed to a catalytic hydrogenation reactor, containing a catalyst comprising 0.2 percent palladium on an activated carbon base. The hydrogenation reactor is operated adiabatically with the exothermic hydrogenation of acetylene resulting in a temperature rise of about 65° C. across the reactor. The hydrogenation is carried out at a temperature of about 65° to 130° C. and a molar ratio of hydrogen to acetylene of about 2 to 2.5:1 at a space velocity of about 1000–8000. Acetylene in the vinyl flouride product stream is reduced to less than about 5 p.p.m., the acetylene being hydrogenated to form both ethylene and ethane.

The vinyl fluoride product stream is cooled and then passed through a drier for final removal of moisture. The gas mixture is then condensed at about 10° C. and 200 p.s.i.g. Minor amounts of hydrogen, carbon monoxide, and ethylene, which are not condensible at this temperature, are then vented from the condensate drum. The vinyl fluoride product stream, containing less than 5 p.p.m. of acetylene, is conducted to a distillation tower operated at about 300 p.s.i.g. with a head temperature of about −10° C. The separation is made between ethane (B.P. −88.6° C.) and vinyl fluoride (B.P. −72° C.). The overhead, comprising about 2 to 3 percent of the total feed and containing mostly ethylene and ethane with some vinyl fluoride, is removed along with traces of hydrogen and carbon monoxide. The bottoms fraction, containing about 64 mole percent vinyl fluoride, 35 mole percent difluoroethane and about 0.5 mole percent ethyl fluoride, is fed to a second distillation column operated at about 200 p.s.i.g. at a head temperature of about 0° C. The vinyl fluoride monomer is taken overhead and stored in tanks at a temperature of about −10° C. and a pressure of about 150 p.s.i.g., or it may be directed to a polymerization reactor.

The vinyl fluoride monomer composition of the product is about 99.9 percent vinyl fluoride with less than 5 p.p.m. acetylene. The bottoms from the second distillation column contain essentially difluoroethane with about 1.5 percent ethyl fluoride and some vinyl fluoride. This stream is collected in a surge tank, vaporized and recycled to the vinyl fluoride reactor. Ethyl fluoride, bring thermally unstable, decomposes to ethylene and hydrogen fluoride over the aluminum fluoride catalyst at 275° C. The overall yield from the monomer process, based on acetylene and hydrogen fluoride, is about 90 percent.

It is to be understood that although the invention has been described with specific reference to particular embodiments thereof, it is not to be so limited since changes It is claimed:

1. A process for the preparation of vinyl fluoride monomer which comprises, in combination, the steps of (a) contacting acetylene and hydrogen fluoride in a reaction zone containing a hydrofluorination catalyst comprising fluosulfonic acid having dissolved therein the reaction product of fluosulfonic acid with about 0.5 to 5 weight percent of an anhydrous metal chloride selected from the group consisting of tin tetrachloride, titanium tetrachloride and antimony pentachloride for a sufficient period of time to effect reaction of said acetylene and hydrogen fluoride to form a 1,1-difluoroethane product; (b) contacting said 1,1-difluoroethane product with acetylene in the presence of a disproportionation catalyst for a sufficient time to effect reaction of said 1,1-difluoroethane and acetylene to form a vinyl fluoride product; (c) selectively hydrogenating acetylene in said vinyl fluoride product in the presence of hydrogen and a hydrogenating catalyst containing a Group VIII metal on a catalytic support for a sufficient time to reduce the acetylene content in said vinyl fluoride product to less than about 10 parts per million and recovering a vinyl fluoride monomer product.

2. A process for the preparation of vinyl fluoride monomer which comprises, in combination, the steps of contacting acetylene together with hydrogen fluoride in a molar ratio of hydrogen fluoride to acetylene of about 1.5 to 3:1, in a reaction zone with a hydrofluorination catalyst comprising fluosulfonic acid having dissolved therein the reaction product of fluosulfonic acid with about 0.5 to about 5 weight percent of an anhydrous metal chloride selected from the group consisting of tin tetrachloride, titanium tetrachloride and antimony pentachloride at a temperature of from about 20° to 70° C. for a sufficient period of time to effect reaction of said acetylene and hydrogen fluoride to a 1,1-difluoroethane product, contacting said 1,1-difluoroethane product, together with acetylene, in a molar ratio of 1,1-difluoroethane to acetylene of about 1.5 to 3.0:1 with a disproportionation catalyst comprising partially hydrated aluminum fluoride containing less than about 1 percent moisture content at a temperature of about 225° to 300° C. and a space velocity of about 200 to 300 for a sufficient period of time to effect disproportionation of said 1,1-difluoroethane and acetylene to a vinyl fluoride product, selectively hydrogenating acetylene in said vinyl fluoride product in the presence of a hydrogen-carbon monoxide stream, containing 25 to 75 parts per million carbon monoxide, based on the total feed stream to the hydrogenation reaction, in a molar ratio of hydrogen to acetylene in a range of about 1.5 to 2.5:1, and a hydrogenation catalyst comprising about 0.001 to about 1 weight percent palladium on a catalytic support at a temperature of about 65° to 150° C., pressures within the range of about 100 to 600 p.s.i.g., and space velocities from about 500 to 8,000 for a sufficient period of time to reduce the acetylene content in said vinyl fluoride product to less than about 10 parts per million, and recovering a vinyl fluoride monomer product.

3. A process for the preparation of vinyl fluoride monomer which comprises contacting 1,1-difluoroethane with acetylene in the presence of a disproportionation catalyst for a sufficient time to effect reaction of said 1,1-difluoroethane and acetylene to form a vinyl fluoride product, selectively hydrogenating acetylene in the said vinyl fluoride product in the presence of hydrogen and a hydrogenation catalyst containing a Group VIII metal on a catalytic support for a sufficient time to reduce the acetylene content in said vinyl fluoride product to less than about 10 parts per million and recovering a vinyl fluoride monomer product.

4. The method of claim 3 wherein disproportionation of 1,1-difluoroethane with acetylene to a vinyl fluoride product is effected by passing a mixture of said 1,1-difluoroethane and acetylene in a molar ratio of about 1.5 to 3:1 of difluoroethane to acetylene through a bed of a disproportionation catalyst comprising a partially hydrated aluminum fluoride containing less than 1 percent moisture at a temperature of about 200° to 400° C. in a space velocity of about 100 to 400.

5. The method of claim 3 wherein hydrogenation of the vinyl fluoride product containing acetylene is effected by passing said vinyl fluoride product and hydrogen in a molar ratio of hydrogen to acetylene in a range of about 1 to about 4:1 at a temperature of from about 40° to 500° C. and a pressure within the range of about 100 to 600 p.s.i.g. and a space velocity within the range of about 500 to 8,000 over a hydrogenation catalyst containing a platinum metal of Group VIII on a catalytic support.

6. The method of claim 5 wherein the molar ratio of hydrogen to acetylene is about 1.5 to 2.5:1 and carbon monoxide is present in admixture with the hydrogen in amounts up to about 100 parts per million based on the total feed stream to the hydrogenation reactor.

7. A process for separating acetylene from a gas comprising vinyl fluoride monomer, which comprises contacting said gas with a hydrogen-carbon monoxide stream in a molar ratio of hydrogen to acetylene in the said gas in the range of about 1 to about 4:1, and the carbon monoxide in admixture with the hydrogen is present in amounts up to about 100 parts per million based on the total feed stream to the hydrogenation reactor in the presence of a hydrogenation catalyst containing a Group VIII metal at a temperature of from about 40° to 500° C. and a pressure within the range of about 100 to 600 p.s.i.g. at a space velocity in the range of about 500 to 8,000, and recovering a vinyl fluoride monomer containing less than about 10 parts per million acetylene.

8. A process for the preparation of 1,1-difluoroethane which comprises contacting acetylene and anhydrous hydrogen fluoride in a reaction zone containing a hydrofluorination catalyst comprising fluosulfonic acid having dissolved therein the reaction product of fluosulfonic acid with about 0.5 to about 5 weight percent of an anhydrous metal chloride selected from the group consisting of tin tetrachloride, titanium tetrachloride and antimony pentachloride for a sufficient period of time to effect reaction of said acetylene and hydrogen fluoride to form a 1,1-difluoroethane product.

9. A process for separating acetylene from vinyl fluoride monomer which comprises selectively hydrogenating acetylene in said vinyl fluoride by contacting said vinyl fluoride with hydrogen in the presence of a hydrogenation catalyst containing a Group VIII metal on a catalytic support for a sufficient time to reduce the acetylene content in said vinyl fluoride product to less than 10 parts per million.

10. The method of claim 9 wherein hydrogenation of the vinyl fluoride monomer is effected by passing said vinyl fluoride and hydrogen in a molar ratio of hydrogen to acetylene in the range of about 1 to 4:1 at a temperature of from 40° to 500° C. and a pressure within the range of about 100 to 600 p.s.i.g. and a space velocity within the range of about 500 to 8000 over a hydrogenation catalyst containing a platinum metal of Group VIII on a catalytic support.

11. The method of claim 9 wherein the molar ratio of hydrogen to acetylene is about 1.5 to 2.5:1 and carbon monoxide is present in an admixture with the hydrogen in amounts up to 100 parts per million based on the total feed stream to the hydrogenation reactor.

12. A process for the preparation of vinyl fluoride monomer which comprises in combination the steps of (a) contacting acetylene and hydrogen fluoride in a reaction zone containing a hydrofluorination catalyst comprising fluosulfonic acid having dissolved therein the reaction product of fluosulfonic acid with about 0.5 to about 5 weight percent of an anhydrous metal chloride selected from the group consisting of tin tetrachloride, titanium tetrachloride and antimony pentachloride for a sufficient period of time to effect reaction of said acetylene and hydrogen fluoride to form a 1,1-difluoroethane product and (b) passing said 1,1-difluoroethane product with acetylene in a molar ratio of about 1.5 to 3:1 of difluoroethane to acetylene through a bed of a disproportionation catalyst comprising a partially hydrated aluminum fluoride containing less than 1% moisture at a temperature of about 200° to 400° C. and a space velocity of about 100 to 400 to form vinyl fluoride monomer.

References Cited by the Examiner

UNITED STATES PATENTS

| | | |
|---|---|---|
| 2,379,670 | 7/1945 | Welling et al. |
| 2,462,359 | 2/1949 | Calfee et al. _____ 260—653.6 |
| 2,634,300 | 4/1953 | Hillyer et al. _____ 260—653.4 |
| 2,830,100 | 4/1958 | Swamer. |
| 3,098,882 | 7/1963 | Arnold. |

OTHER REFERENCES

Bond et al., Transaction of the Faraday Society, 54, 1537–1546 (1958).

Sheridan, J. Chem. Soc., 1945, 470–476.

DANIEL D. HORWITZ, *Acting Primary Examiner.*